United States Patent

[11] 3,539,138

[72] Inventor Philip J. Desroches
 79 Town Brook Road, West Yarmouth,
 Massachusetts 02673
[21] Appl. No. 727,230
[22] Filed May 7, 1968
[45] Patented Nov. 10, 1970

[54] APPARATUS FOR SUPPORTING AND CONNECTING CYLINDRICAL MEMBERS
 12 Claims, 22 Drawing Figs.
[52] U.S. Cl. .................................................. 248/62,
 24/81, 248/231, 248/300
[51] Int. Cl. ...................................................... F16l 3/02,
 F16l 3/12
[50] Field of Search ........................................... 248/62,
 231, 300; 24/81(C), 81.3, 81(CC), 81(CR)

[56] References Cited
UNITED STATES PATENTS

| | | | |
|---|---|---|---|
| 2,091,763 | 7/1937 | Macbeth ...................... | 24/81X |
| 2,383,881 | 8/1945 | Murphy ....................... | 248/231X |
| 2,412,464 | 12/1946 | Mayer .......................... | 248/231X |
| 2,908,470 | 10/1959 | Garman ........................ | 248/231 |
| 3,212,743 | 10/1965 | Culver .......................... | 248/231X |

FOREIGN PATENTS

| | | | |
|---|---|---|---|
| 960,508 | 4/1950 | France ......................... | 24/81 |
| 1,343,400 | 10/1963 | France ......................... | 24/231 |

*Primary Examiner*—Chancellor E. Harris
*Attorney*—Robert R. Churchill

ABSTRACT: A connector having opposed pairs of arms bent to cooperate with adjacent cylindrical members and adapted for use with hose clamps to secure the arms of the connector to the cylindrical members.

Patented Nov. 10, 1970

Inventor:
Philip J. Desroches,
by Robert Churchill
Attorney

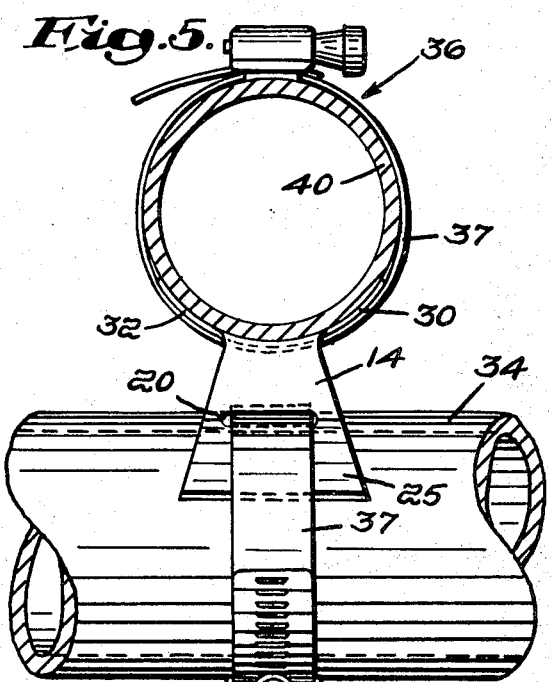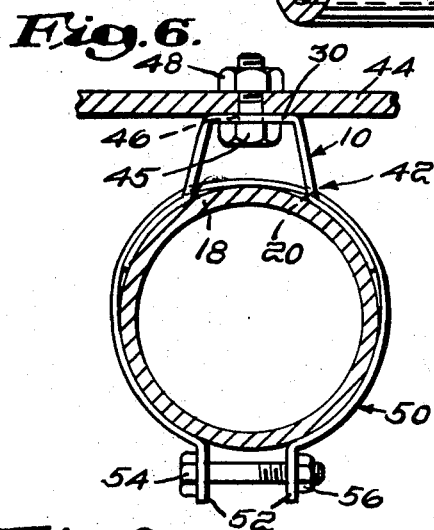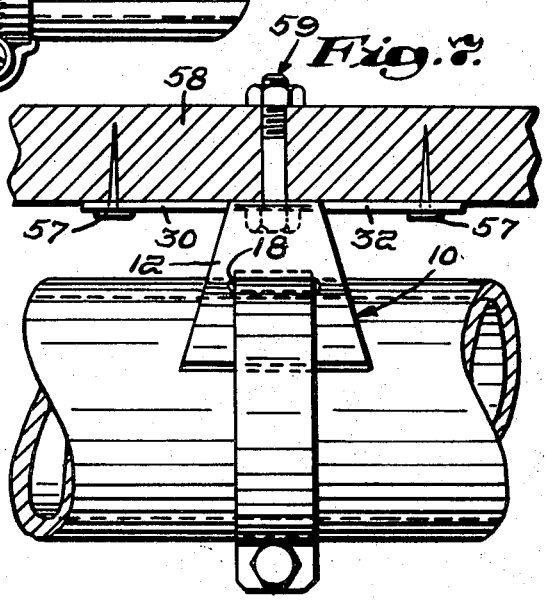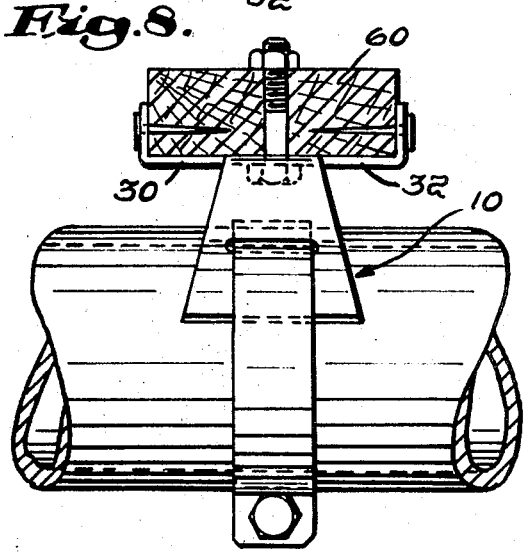

Patented Nov. 10, 1970
3,539,138
Sheet 3 of 4
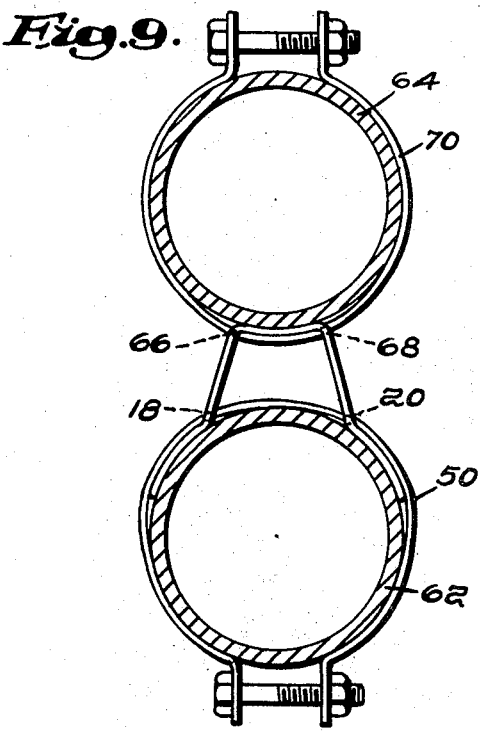
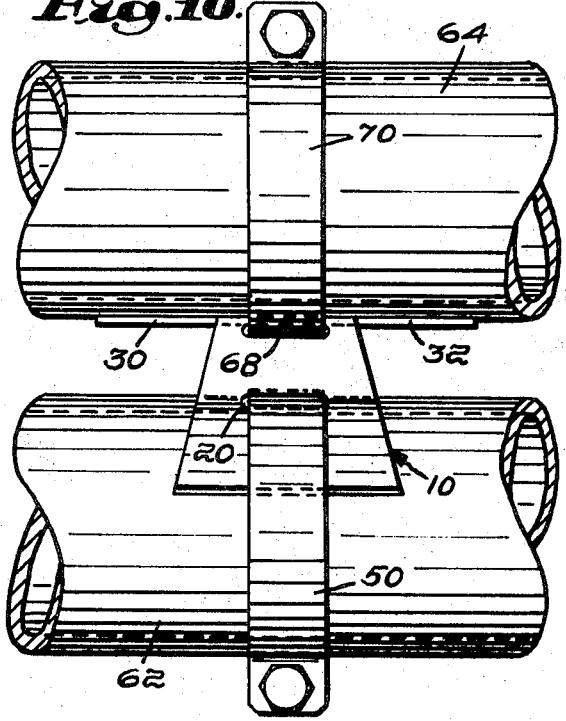
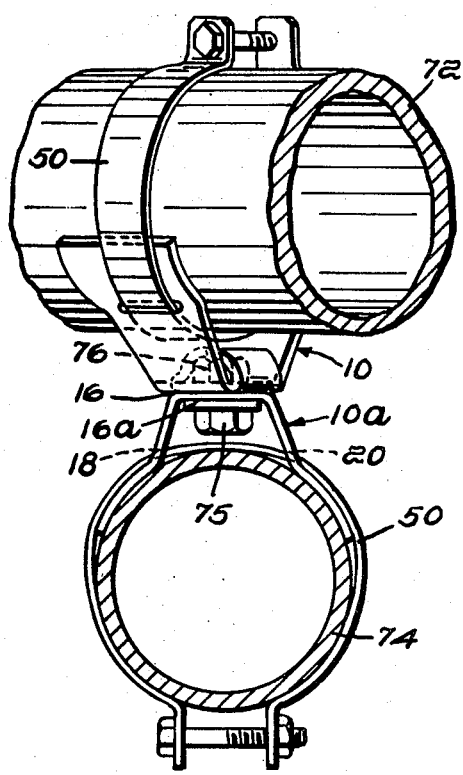
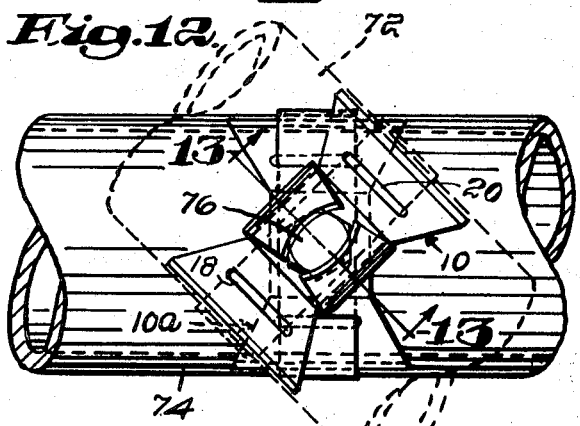
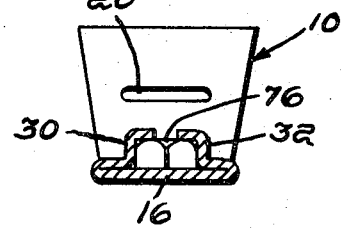
Inventor:
Philip J. Desroches,
by Robert R. Churchill
Attorney Patented Nov. 10, 1970
3,539,138
Sheet 4 of 4
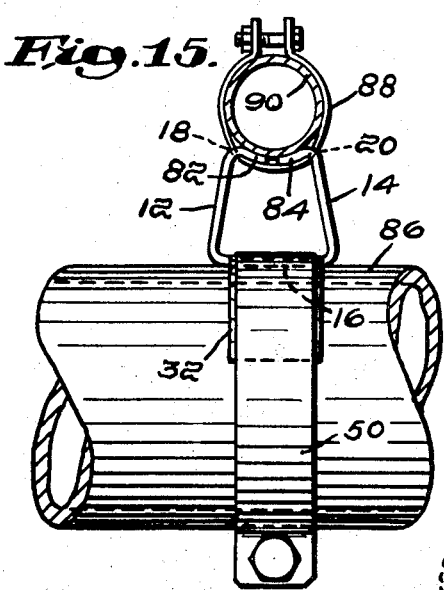
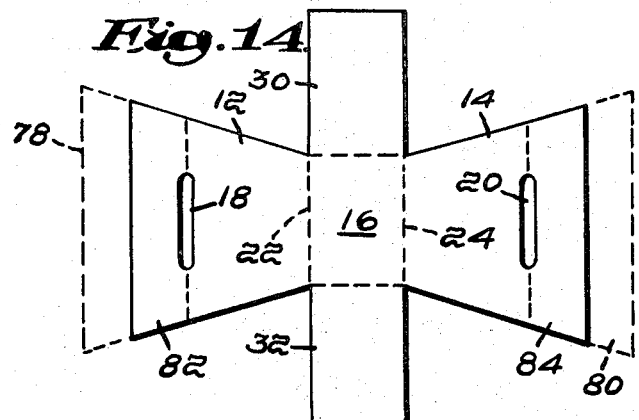
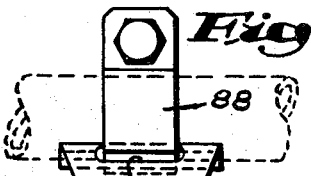
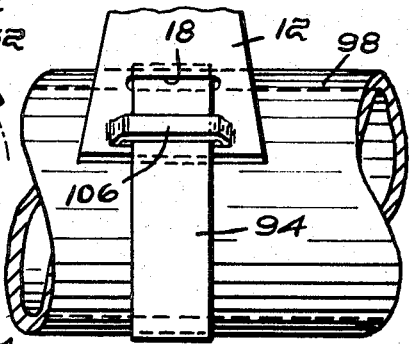
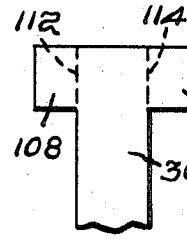
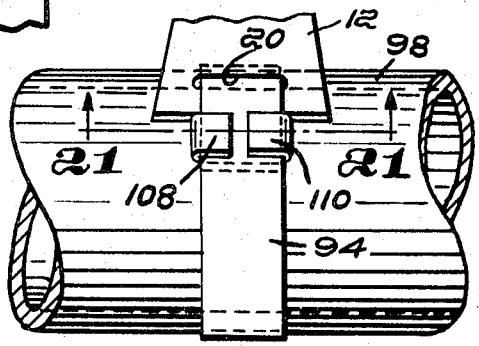
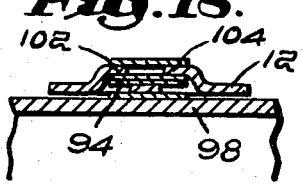
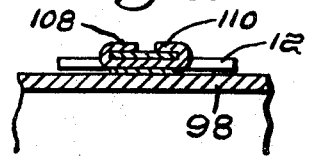
Inventor:
Philip J. Desroches,
by Robert R. Churchill
Attorney

APPARATUS FOR SUPPORTING AND CONNECTING CYLINDRICAL MEMBERS

This invention relates to apparatus for supporting and connecting cylindrical members.

The invention has for an object to provide novel and improved apparatus which includes a novel connector for use with hose clamps in connecting together two cylindrical members in a simple and efficient manner.

The invention has for another object to provide novel and improved apparatus of the character specified wherein the connector is adapted to conform to the contour of the cylindrical member during application thereof to the member.

With these general objects in view and such others as may hereinafter appear, the invention consists in the apparatus for supporting and connecting cylindrical members as hereinafter described and particularly defined in the claims at the end of this specification.

In the drawings illustrating the preferred embodiment of the invention:

FIG. 5 is a front elevation of FIG. 4;

FIG. 6 is a side elevation of the present connector illustrating its use as a hanger;

FIGS. 7 and 8 are views in front elevation of modified forms of the connector in use as a hanger;

FIG. 9 is a side elevation of a modified form of the present connector wherein parallel pipes are connected in spaced relation;

FIG. 10 is a front elevation of the structure shown in FIG. 9;

FIG. 11 is a view showing a pair of the present connectors arranged back to back and bolted together for connecting two cylindrical members at an angle;

FIG. 12 is a plan view of the structure shown in FIG. 11, the upper pipe being shown in broken lines;

FIG. 13 is a cross-sectional view taken on the line 13–13 of FIG. 12;

FIG. 14 is a developed view of a modified form of connector;

FIG. 15 is an end view of the modified form of connector shown in FIG. 14 bent and shaped for supporting a small diameter pipe;

FIG. 16 is a front view detail of the connector shown in FIG. 15;

FIG. 17 is a front elevation of another modified form of connector shown connecting two pipes at right angles to each other;

FIG. 18 is a cross-sectional view taken on the line 18–18 of FIG. 17;

FIG. 19 is a partial view of a further modified form of connector;

FIG. 20 is a partial view in front elevation of still another modified form of connector;

FIG. 21 is a cross-sectional view taken on the line 21–21 of FIG. 20; and

FIG. 22 is a detail view of a portion of the connector arms modified to provide laterally extended portions.

Figure 1:
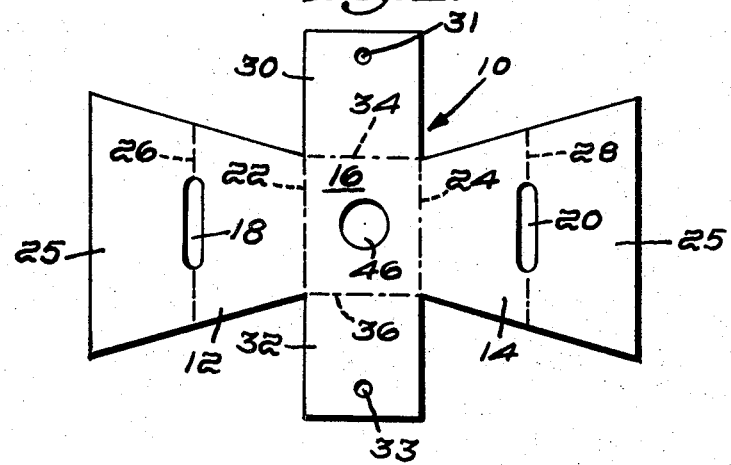
FIG. 1 is a developed view of a connector embodied in the present invention.

In general, the present invention contemplates novel and improved apparatus which includes a connector for use with hose clamps which may be used for connecting together two cylindrical members, such as pipes, or which may be used as a hanger or support for cylindrical members. The connector finds particular use in the building construction field and may be easily converted in the field to fit pipes or other cylindrical members of various sizes. This feature of the invention enables the same size connector to be used for a wide range of different diameter pipes to provide in effect a universal connector for the purpose defined.

Referring now to the drawings, 10 represents the present connector in developed form in the general shape of a cross and which may be stamped, punched or otherwise die-cut out of bendable material, such as sheet metal or other suitable material. The laterally extended arms 12, 14 of the cross are wing-shaped and extend from a central rectangular portion 16. The wings 12, 14 are provided with transverse slots 18, 20 disposed intermediate the ends thereof. Scribed or otherwise formed lines 22, 24 defining the edges of the rectangular portion 16 facilitate subsequent bending of the wings along said lines, and scribed lines 26, 28 coextensive with slots 18, 20, respectively, are provided for a similar purpose. The other arms 30, 32 of the cross are rectangular in shape and extend vertically from the central rectangular portion 16 as shown. Scribed lines 34, 36 defining the remaining sides of the central portion 16 also facilitate bending along said sides.

Figure 2:
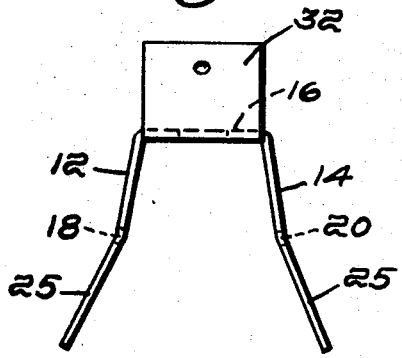
FIG. 2 is a side elevation showing the bends initially formed in one pair of arms of the connector.
Figure 3:
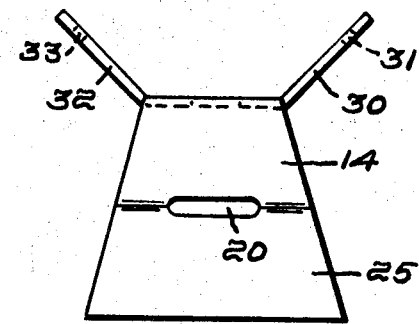
FIG. 3 is a front elevation of the connector shown in FIG. 2 showing the bends initially formed in the second pair of arms.

In producing the connector 10, the arms or wings 12, 14 are first bent downwardly along lines 22 and 24 at an angle of about 80° to the plane of the central portion 16 and the ends 25 of the arms are then bent outwardly along the lines 26, 28 at an angle of about 15° with respect to the plane of their respective wing portions 12, 14 as illustrated in FIG. 2. The other arms, 30, 32 are bent upwardly at an angle of about 45° from the plane of the central portion 16 as illustrated in FIG. 3.

Figure 4:
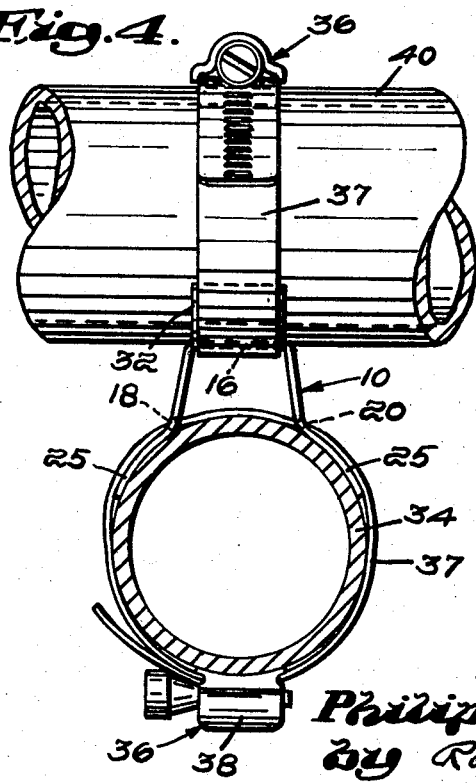
FIG. 4 is a side elevation of a connector shown in cooperation with hose clamps for connecting two pipes arranged at right angles to each other.

The connector thus produced is connected to one pipe 34 by means of a hose clamp 36. As shown in FIG. 4, the hose clamp 36 may comprise a conventional aircraft hose clamp and in use the strap or band portion 37 is threaded through the slots 18, 20, the free end of the band then being engaged in the clamp end 38 of the band and tightened about the pipe 34. It will be observed that the band which passes through the slots also passes over the ends 25 of the wings 12, 14. In practice, when the band 37 is tightened about the pipe, the bendable ends 25 are caused to bend to conform to the contour of the diameter of the pipe as shown in FIG. 4.

With this construction it will be seen that a connector 10 of one size is adapted for use with a large range of sizes or diameters of pipes within predetermined limits. In practice, the wings 12, 14 may be bent by hand or with a pair of pliers to straddle pipes of different sizes, and likewise the ends 25 of the wings may also be bent in the field at an angle suitable for the size of pipe to be connected.

As shown in FIGS. 4 and 5, another aircraft hose clamp 36 serves to secure the connector to a second pipe 40 arranged at right angles to the pipe 34. The hose clamp in this instance is wrapped about the outer surfaces of the central portion 16 and the extended legs 30, 32, the free end of the band being then engaged with the clamp end and tightly drawn together to effect bending of the legs to conform to the contour of the diameter of the pipe 40, as illustrated in FIG. 5.

In a modified form of the invention wherein the connector is used as a hanger, as indicated generally at 42 in FIG. 6, the arms 30, 32 of the connector are not bent up but are left straight as shown. In FIG. 6, the hanger is bolted to a metal support 44, the bolt 45 passing through a central opening 46 initially provided in the section 16 and through an opening in the support, the bolt being provided with a nut 48. In this embodiment the hose clamp 50 is shown as comprising a band of bendable metal which is extended through the slots 18, 20, then wrapped about the pipe 51 and then bent at its ends to provide opposed parallel ears 52. The ears are then provided with openings and a bolt 54 extended therethrough and the band is tightened by a nut 56.

As illustrated in FIG. 1, the arms 30, 32 are provided with small openings 31, 33 adjacent the ends thereof. The structure shown in FIG. 7 is the same as that shown in FIG. 6 except that nails 57 are extended through the openings 31, 33 and driven in to secure the connector to the wooden support 58. The connector may also be bolted to the wooden support by a bolt and nut 59 as indicated in FIG. 7.

In another modified form of the present connector in use as a hanger, the ends of the arms 30, 32 are bent up to fit against the sides of a wooden support 60, as shown in FIG. 8, and the ends are nailed to the support. This connector may also be bolted to the support 60 in the manner indicated.

Referring now to FIGS. 9 and 10, the present connector is illustrated in use as a connector for connecting two pipes 62, 64 in parallel or as a hanger for supporting a pipe 62 from and in spaced relation to an existing pipe 64. In this embodiment of the invention the arms 30, 32 are extended horizontally and a second pair of slots indicated at 66, 68 is provided at the upper ends of the wings 12, 14 adjacent the bend lines 22, 24 as shown. In operation, the hose clamp 50 is threaded through the lower slots 18, 20 and tightened about the pipe 62 as described. Then a second hose clamp 70 is threaded through the upper slots 66, 68 and tightened about the pipe 64. As described in connection with the previous embodiments, tightening of the hose clamps effects curving of those portions of the connector engaged by the clamp to conform to the curvature of the pipe.

As illustrated in FIGS. 11 and 12, when two pipes 72, 74 are to be connected together in spaced relation and at an angle to each other, two connectors 10 and 10a may be connected back to back with the portions 16 face to face and a bolt 75 extending through the openings 46 and secured together by a nut 76. The arms 12, 14 of each connector straddle their respective pipes 72, 74 and the hose clamps 50 extend through the slots 18, 20 of each connector and are tightened around their respective pipes. As shown in FIG. 12, one pipe 72 shown in broken lines is arranged at an angle of 45° with relation to the second pipe 74, and it will be apparent that this structure is adapted to accommodate pipes arranged at any angle. In this embodiment of the invention the arms 30, 32 may be eliminated or, as illustrated in FIG. 13, the arms may be shortened and the ends thereof bent upwardly and inwardly to enclose the nut 76 so as to prevent rotation thereof relative to its connector. Alternatively, the nut may be spot-welded to the area 16 in alignment with the opening 46.

In a further modified form of the present invention, the connector may be adapted to support a relatively small diameter pipe as illustrated in FIG. 15. In this embodiment of the invention, the developed blank shown in FIG. 14 is modified by cutting off portions 78, 80 shown in broken lines from the free ends of the arms 12, 14 respectively. Scored lines may be provided to define the cutoff line. The arms 12, 14 are then bent upwardly along scored lines 22, 24, and the portions 82, 84 remaining beyond the slots 18, 20 are bent inwardly to take the form shown in FIG. 15. The arms 30, 32 are bent downwardly at an angle of about 45°. In operation a hose clamp 50 may be wrapped around the arms 30, 32 and the section 16 and is tightly clamped around the larger pipe 86 to cause the arms to assume the curvature of the pipe. A second and smaller hose clamp 88 is then threaded through the slots 18, 20 and around the relatively small pipe 90 to be supported. Tightening of the clamp will cause the portions 82, 84 to conform to the curvature of the smaller pipe.

FIG. 17 illustrates the present connector modified to accommodate relatively thin steel fastening bands 92, 94 and arranged to connect together at right angles pipes 96, 98. The band 92 has one end folded upon itself and hooked over the end of the arm 30. Adjacent the end of each arm 30, 32 opposed lugs 102, 104 are stamped from the connector material and initially bent upwardly, the lugs being subsequently pressed down on top of the band to clamp the same as shown in FIG. 18. In operation, the band 92 is extended from the hooked end between one pair of lugs 102, 104 of arm 30, then about the arms 30, 32, and between the lugs 102, 104 of arm 32, the lugs of this arm being pressed or hammered down over the band at this point. The band 92 is then continued about the pipe 96 and the end thereof placed on top of the hooked end between the lugs 102, 104 of the arm 30. These lugs are then pressed down to secure the ends together and to the arm 30. The last secured end of the band may then be bent upwardly to form a hooked end about the lugs as shown. The wing-shaped legs 12, 14 which engage the pipe 98 are also provided with opposed lugs 102, 104 disposed immediately below their respective slots 18, 20. In operation, one end of the band 94 is bent and hooked around the lower edge of one slot 18, then extended over the end portion of the arm 12 between the upraised lugs, then around the underside of the pipe 98, between the lugs of the second arm 14, through the second slot 20, around the top of the pipe and through the first slot 18 to place the second end of the band on top of the first end and between the first pair of lugs 102, 104. The lugs are then hammered down on top of the band ends to connect the same and secure the band to the pipe 98. The second end of the band may then be bent up to form a hooked end about the lugs as shown.

FIG. 19 illustrates a modified form of connector also adapted for use with their steel bands 92, 94 and which may be similar to the structure shown in FIG. 17 except that instead of providing lugs 102, 104 for clamping the bands, a loop 106 upset from the connector material is provided as shown. In practice, the bands 92, 94 may be hooked and wrapped about the connector and the pipes in the same manner as above described in connection with FIG. 17, the loop 106 being hammered down on the bands passed thereunder to secure the same.

Another modification of the structure for accommodating thin steel bands is shown in FIG. 20 wherein the arms 12, 14 of the connector are provided with rectangular lugs 108, 110 formed integrally with the connector and which are initially bent up at right angles to the arms, and after the bands are wrapped about the pipes and extended between the lugs, the latter may be bent down over the bands as shown. Otherwise the structure and mode of application of the bands is similar to the structure shown in FIG. 16. The lugs are shown in cross section in FIG. 21. As shown in FIG. 22, the arms 30, 32 are provided with laterally extended portions at their ends arranged to be bent up along score lines 112, 114 to provide the lugs 108, 110.

It will be observed that where bends occur, the structure presents its minimum resistance to bending. Thus, the blank shown in FIG. 1 is provided with scored lines to facilitate bending at such points. Also, a bend occurs along a line coextensive with the slots which also renders the metal easier to bend along such line.

From the description thus far, it will be seen that the present apparatus for supporting and connecting cylindrical members includes a novel connector simple in structure and efficient in use and which is adapted to be modified in the field to fit a plurality of different diameters of pipe. In practice, the connector may of course be made in different sizes to fit different ranges of pipe diameters. Also, the connectors may be made in different gauges of sheet metal to suit the strength requirements of a particular installation. It will be understood also that the connectors may be made of any of various kinds of metal suitable for a particular job. For example, for marine work where the piping may be submerged, the connectors will be made of a nonrusting metal. It will also be understood that the hose clamps or fastening bands may be of different types and of different materials as required. For some installations it may be of advantage to make the connectors of suitable plastic or dielectric material such as when used for supporting electrical conduits. In other installations it may be desirable to dip the connectors in rubber for resistance to corrosion or electrical action, such as when used under water, such as for use with cables. When made of a plastic material, such as nylon, the connectors will be preformed in the size suitable for the diameter of the pipe to which it is to be applied for a particular installation. Also, when the connector is made of metal, such as heavy gauge steel, the connector may also be preformed that is, it will be bent to fit the pipe to which it is to be applied instead of relying on the hose clamp to make the arms conform to the pipe curvature as is possible with the lighter gauge bendable metals.

While the connectors may have been herein described for use as pipe connectors, supports or hangers, it will be apparent that the present connectors may be employed with advantage in any installation where cylindrical supports or other members are required to be secured together in closely spaced relation. A partial list of such uses may include its use in connecting circular elements making up a painter's or builder's staging; connecting cylindrical portions of T. V. antennaes; sign brackets; conduits; hose and the like. In practice, the connector may be shipped in its flat form, as shown in FIG. 1, for economy in shipping space, the arms being bent to the required shape in the field. The efficiency and utility of the connector is readily apparent and the simplicity of the structure renders the connectors capable of being manufactured economically. Where the unit is used as a hanger and bolted to a support, as shown in FIG. 6, it will be apparent that a second unit upstanding from the beam 44 may be connected to the beam by means of the same bolt 45 to provide an upstanding support. It will be seen that the connector 10 in its bent and shaped form resembles a saddle and may generally be termed "saddle shaped".

While the preferred embodiment of the invention has been herein illustrated and described, it will be understood that the invention may be embodied in other forms within the scope of the following claims.

I claim:

1. A connector of the character described comprising an article having two pairs of opposed arms extended from and integral with a central web, at least one pair of arms being bent to engage cylindrical portions of a cylindrical member, means cooperating with the engaged portions of said one pair of arms for securing the connector to the member, said second pair of arms being adapted for attachment to a support.

2. A connector as defined in claim 1 wherein said second pair of arms are bent in a direction opposite from said first pair to engage a second cylindrical member, and means cooperating with the second pair of arms for securing the same to said second member.

3. A connector as defined in claim 2 wherein the connector comprises a sheet metal material wherein each pair of legs is preformed to fit the curvature of a cylindrical member.

4. A connector as defined in claim 2 wherein a second cylindrical member is arranged at right angles to said first member.

5. A connector as defined in claim 2 wherein the means for securing the engaged portions of the arms to their respective cylindrical members comprise hose clamps.

6. A connector of the character described comprising an article having two pairs of opposed arms extending from and integral with a central web portion, one pair of arms being bent to engage portions of a cylindrical member, the second pair of arms being in the same plane as the web, said bent arms having transverse slots arranged to receive a metal band to secure the same to the cylindrical members.

7. A connector of the character described comprising a one-piece article of bendable metal in the general shape of a cross having two pairs of opposed arms extending from a central area, one pair of said arms being bent downwardly to engage spaced portions of the surface of a cylindrical member, the second pair of arms being extended horizontally, said bent arms having transverse slots intermediate their ends for receiving a clamp applied about the cylindrical member, said second pair of arms adapted for attachment to a stationary support.

8. As a new article of manufacture, a connector adapted for use with clamping means for supporting and connecting cylindrical members in spaced relation to each other, said connector comprising a one-piece article of bendable metal initially in the general shape of a cross having two pairs of opposed arms extended from a central area, one pair of arms being bent downwardly from said central area at an angle of about 80°, said downwardly bent arms then being bent outwardly from a point intermediate their ends at an angle of about 15°, the second pair of arms being bent upwardly from said central area at an angle of 45°, the engaging portions of said arms being bent to the curvature of their respective cylindrical members upon tightening of the clamping means about said engaging portions and the cylindrical members.

9. A connector of the character described comprising an article having two pairs of opposed arms, one pair of arms being bent downwardly and shaped to fit the curvature of one cylindrical member, clamping means securing the arms to said member, the second pair of arms being bent upwardly and inwardly to form a seat for a relatively small diameter cylindrical member, and a second clamping means securing the small diameter member to said seat.

10. A connector of the character described adapted for connecting two cylindrical members in angular relation to each other comprising a pair of connectors connected back to back for annular adjustment, each connector comprising a central web portion and two pairs of arms, one pair of arms bent from the central web portion to engage portions of a cylindrical member, the other pair of arms bent inwardly over said web portion, and clamping means for securing said cylinder-engaging arms to said cylinders.

11. A connector as defined in claim 10 wherein the central web portions on each connector are provided with an aperture, and a threaded nut is aligned with and secured to the portion of the web of one connector surrounding said aperture, the connectors being secured together back to back by a bolt engaging the fixed nut.

12. A connector as described in claim 1 wherein one pair of arms is shorter than the other pair and adapted to be secured to a noncylindrical member for supporting the cylindrical member from said noncylindrical member.